US008421607B2

(12) United States Patent
Mahoney (10) Patent No.: US 8,421,607 B2
(45) Date of Patent: Apr. 16, 2013

(54) PERSONAL ALERT DEVICE (76) Inventor: Sean Mahoney, Decatur, GA (US)

( * ) Notice: Subject to any disclaimer, the term of this patent is extended or adjusted under 35 U.S.C. 154(b) by 846 days.

(21) Appl. No.: 12/557,448

(22) Filed: Sep. 10, 2009

(65) Prior Publication Data

US 2011/0057809 A1    Mar. 10, 2011

(51) Int. Cl.
*H04B 3/36* (2006.01)
(52) U.S. Cl.
USPC ............... 340/407.1; 340/539.1; 340/539.11; 340/573.1
(58) Field of Classification Search ............ 340/407.1, 340/539.11, 573.1, 825.69, 539.1, 825.72; 455/41.2, 422.1, 557, 567
See application file for complete search history.

(56) References Cited

U.S. PATENT DOCUMENTS

| | | | |
|---|---|---|---|
| 5,722,071 A | 2/1998 | Berg et al. | |
| 6,119,022 A | 9/2000 | Osborn et al. | |
| 6,650,231 B1 * | 11/2003 | Byrne | 455/567 |
| 6,954,659 B2 | 10/2005 | Tushinsky et al. | |
| 7,130,664 B1 * | 10/2006 | Williams | 455/567 |
| 7,199,700 B1 | 4/2007 | McPherson et al. | |
| 7,203,524 B2 | 4/2007 | Tushinsky et al. | |
| 7,433,649 B2 | 10/2008 | Toulis et al. | |
| 2008/0246597 A1 * | 10/2008 | Carlson et al. | 340/500 |

OTHER PUBLICATIONS http://www.engadget.com/2007/12/09/the-vibrating-bluetooth-bracelet/—vibrating Bluetooth bracelet, available online.

* cited by examiner

*Primary Examiner* — Hung T. Nguyen
(74) *Attorney, Agent, or Firm* — Crose Law LLC; Bradley D. Crose (57) ABSTRACT A personal alert device for use with a wireless communications device is provided. In at least one embodiment, the personal includes: a housing configured for discreet, inconspicuous use by a wearer; a vibrator mechanism disposed within the housing; a processor disposed within the housing, the processor configured to pair uniquely and wirelessly communicate with a mobile communications device within a defined distance to the mobile communications device, operative to receive a mobile communications signal from the mobile communications device, and further configured to activate the vibrator mechanism to alert the wearer discreetly to the presence of the mobile communications signal; and a power source disposed within the housing. In at least one embodiment, the personal alert device is a fashion accessory article that is worn under an item of apparel and directly adjacent to the body of the wearer to remain unseen.

17 Claims, 9 Drawing Sheets

FIG. 9

# PERSONAL ALERT DEVICE

FIELD OF THE INVENTION

The technology described herein relates generally to electronic alert devices. More specifically, this technology relates to a device for generating a personal alert responsive to a wireless communication signal and configured to discreetly alert the wearer upon receipt of a wireless communication signal, such as that generated by a wireless mobile device, while the alert remains inconspicuous to others.

BACKGROUND OF THE INVENTION

Mobile telephones, personal digital assistants, wireless communication devices, and the like, are nearly ubiquitous. Such devices typically employ an audible signal, a vibratory alert, or the like to alert the user to an incoming call or message. Known alert mechanisms do not provide adequate solutions to all wireless communication devices. By way of example, fashion conscious, professional women typically do not have functional pockets in their business attire to store or otherwise carry a wireless communication device. When a suitable location is not available on apparel, a belt, or the like, such users are compelled to stow the wireless communication device in a purse, handbag, duffel, or the like. Storage in such a manner makes it increasingly difficult for the user to receive an audible signal or a vibratory alert to alert the user of an incoming call or message.

Additionally, the use of audible signals or vibratory alerts is often prohibited or otherwise discouraged in certain environments. Even under circumstances where audio signal alerts are prohibited, the alternative use of vibratory signals to create a vibration directly on the mobile phone, for example, is not at all discreet. It is well known that many vibratory alerts can be heard when vibrating the mobile phone.

Related patents known in the art include the following: U.S. Pat. No. 5,722,071, issued to Berg et al. on Feb. 24, 1998, discloses a portable receiver including a transducer for notifying user of messages received in a remote communications device. U.S. Pat. No. 6,954,659, issued to Tushinsky et al. on Oct. 11, 2005, discloses a fashion accessory with wireless signal alerting device. U.S. Pat. No. 7,203,524, issued to Tushinsky et al. on Apr. 10, 2007, discloses an article with wireless signal alerting device. U.S. Pat. No. 7,433,649, issued to Toulis et al. on Oct. 7, 2008, discloses a tag for facilitating interaction with a wireless communication device. U.S. Pat. No. 6,119,022, issued to Osborn et al. on Oct. 11, 2005, discloses a system for alerting a portable communication device user of an incoming call. U.S. Pat. No. 7,199,700, issued to McPherson et al. on Apr. 3, 2007, discloses a breathminder.

Related non-patent literature known in the art includes a vibrating Bluetooth bracelet, available online at http://www.engadget.com/2007/12/09/the-vibrating-bluetooth-bracelet/. Related non-patent literature known in the art also includes a Bluetooth watch with caller ID, available online at http://www.amazon.com/Bluetooth-Watch-Vibration-Caller-Display/dp/B00282PJ4K/ref=pd_sbs_misc_2.

The foregoing patent and other information reflect the state of the art of which the inventor is aware and are tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's claimed invention.

BRIEF SUMMARY OF THE INVENTION

In various exemplary embodiments, the technology described herein provides a personal alert device for use with a wireless communications device. The personal alert device generates a personal vibratory alert responsive to a wireless communication signal, such as that generated by a wireless mobile device, and is configured to discreetly alert the wearer upon receipt of the wireless communication signal while the alert remains inconspicuous and inaudible to others.

In one exemplary embodiment, the technology described herein provides a personal alert device. The personal alert device includes: a housing configured for discreet, inconspicuous use by a wearer; a vibrator mechanism disposed within the housing; a processor disposed within the housing, the processor configured to pair uniquely and wirelessly communicate with a mobile communications device within a defined distance to the mobile communications device, operative to receive a mobile communications signal from the mobile communications device, and further configured to activate the vibrator mechanism to alert the wearer discreetly to the presence of the mobile communications signal; and a power source disposed within the housing. The vibrator mechanism can be configured to vibrate in a manner that is inaudible.

The personal alert device also includes an attachment portion disposed upon the housing and configured to provide attachment of the personal alert device to the wearer.

The personal alert device also includes a switch disposed upon the housing and configured to provide ON, OFF, and PAIR options to the wearer.

The personal alert device further can include a speakerphone to provide an auditory alert to audibly alert the wearer to the presence of the mobile communications signal.

The processor of the personal alert device can be further configured to provide the wearer a unique vibratory alert when a pairing to the mobile communications device has been dropped.

The personal alert device further can include an ACKNOWLEDGE button disposed upon the housing and configured to be depressed by the wearer to acknowledge and to cease the vibratory alert.

The personal alert device also can include a customization interface to provide the wearer the option to set a unique vibratory signal pattern to a specific incoming call number, wherein the processor is configured to recognize the incoming call number to the mobile communications device, and wherein the processor activates the vibrator mechanism with unique vibratory signal pattern such that the wearer knows an identity of the incoming call based upon the unique vibratory signal pattern.

The personal alert device further can include a customization interface to provide the wearer the option to initiate a unique set of rules to customize alerts, wherein the processor is configured to act based upon the rules customized by the wearer.

In another exemplary embodiment, the technology described herein provides a fashion accessory article operative to provide the wearer a vibratory alert to indicate the presence of a mobile communications signal from a mobile communications device. The fashion accessory article includes: a housing configured for personal use to be entirely worn in a discreet and inconspicuous manner; a vibrator mechanism disposed within the housing; an electrical circuit disposed within the housing and configured for pairing and wireless communication with the mobile communications device within a defined distance, operative to receive the mobile communications signal from the mobile communications device, and further configured to activate the vibrator mechanism to alert the wearer discreetly to the presence of the mobile communications signal; a power source disposed within the housing; and an attachment portion configured to provide attachment of the fashion accessory article to the wearer, wherein the fashion accessory article is worn under an item of apparel and directly adjacent to the body of the wearer to remain unseen.

The fashion accessory article also can include an adhesive panel configured for placement upon the housing and configured to adhere to the fashion accessory article directly to the skin of the wearer and under the item of apparel. The attachment portion can be configured for attachment to a brassiere. The attachment portion can be configured for attachment to an undergarment brief.

The fashion accessory article also can include: a customization interface to provide the wearer of the fashion accessory article the option to set a unique vibratory signal pattern to a specific incoming call number, wherein the processor is configured to recognize the incoming call number to the mobile communications device, and wherein the processor activates the vibrator mechanism with unique vibratory signal pattern such that the wearer knows an identity of the incoming call based upon the unique vibratory signal pattern; and a customization interface to provide the wearer the option to initiate a unique set of rules to customize alerts, wherein the processor is configured to act based upon the rules customized by the wearer.

The fashion accessory article further can include an ACKNOWLEDGE button disposed upon the housing and configured to be depressed by the wearer to acknowledge and to cease the vibratory alert. Additionally, the processor can be further configured to provide the wearer a unique vibratory alert when a pairing to the mobile communications device has been dropped.

The fashion accessory article also can include a switch disposed upon the housing and configured to provide ON, OFF, and PAIR options to the wearer.

The fashion accessory article also can include a speakerphone to provide an auditory alert to audibly alert the wearer to the presence of the mobile communications signal.

In another exemplary embodiment, the technology described herein provides an incoming signal vibratory alert system. The system includes: a wireless communications device; and a personal alert device paired uniquely and wirelessly to the wireless communications device to communicate with the wireless communications device within a defined distance, operative to receive a wireless communications signal from the wireless communications device, and further configured to activate a vibrator mechanism disposed within the personal alert device to alert the wearer discreetly to the presence of the wireless communications signal with a vibratory alert.

The system also includes an attachment portion configured to provide attachment of the personal alert device to the wearer, wherein the personal alert device is worn under an item of apparel and directly adjacent to the body of the wearer to remain unseen.

Advantageously, the technology described herein provides improved notice of mobile phone events in a manner that provides discreet notification to the wearer and remains invisible and inaudible to others. Also advantageously, the technology provides this notification with a unique pairing to a mobile communications device, thereby provided a simple solution with unnecessary extras.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides a personal alert device for use with a wireless communications device. The personal alert device generates a personal vibratory alert responsive to a wireless communication signal, such as that generated by a wireless mobile device, and is configured to discreetly alert the wearer upon receipt of the wireless communication signal while the alert remains inconspicuous and inaudible to others.

While wireless communication devices, such as mobile phones, personal digital assistants (PDAs), and the like, are ubiquitous, there are a number of situations in which a user is unable to receive a notification of an incoming call or other message. For cases in which a mobile phone rings or vibrates properly but the user is unable to hear or feel the notification, the potential exists for lost business, missed opportunities, personal inconvenience, and the like.

By way of example, fashion conscious, professional women do not typically have functional pockets in their business attire, which compels these women to store their mobile phone in a purse or briefcase from where it is difficult to receive notification of an incoming call or message. The personal alert device disclosed herein solves this problem and provides a slender notification device that attaches to a bra strap, undergarment, or the like, or elsewhere underneath her clothes. Such use and wear of the personal alert device lets the wearer know, in a most discreet and inaudible manner, of an event or call on the mobile communications device, in order to avoid detection or notice by others.

The personal alert device is configured to be uniquely paired to the wearer's mobile communication device. The personal alert device requires no direct interaction once the wearer activates the device and places the device on his or her person. The personal alert device can be sold and distributed individually and subsequently configured and paired with an existing mobile communication device. Alternatively, the personal alert device can be sold as original equipment with a mobile communication device at the point of initial sale.

Referring now to the Figures a personal alert device 10 is shown. The personal alert device 10 includes a housing 12 configured for discreet, inconspicuous use by a wearer. The personal alert device 10 is configured in a small, compact, very slender manner to avoid any bulk showing through clothing or apparel. By way of example, and in at least one embodiment, the personal alert device 10 is approximately 5 mm thick, 25 mm wide, and 30 mm long. The personal alert device 10 does not interfere with the fashion aesthetics of the wearer.

The housing 12 is configured to be as thin and compact as possible, yet durable. In use the personal alert device is to be worn under apparel of the wearer or in a manner very proximate to the skin surface of the wearer. Thus, the housing 12 and other components of the personal alert device 10 are miniaturized to the extent that known manufacturing processes allow. The housing 12 and other components of the personal alert device 10 are water resistant and perspiration resistant given the use of the device 10 intimately proximate to the body of the wearer. In at least one embodiment, the housing 12 is of a color resembling the skin color of the wearer, further providing for the discreet use and wear of the personal alert device 10.

Disposed upon the housing 12 of the personal alert device 10 is a switch 16. The switch 16 is configured to provide ON, OFF, and PAIR options to the wearer. The switch 16 is easily operated to switch between these options. ON powers the device into a working "on" status. OFF turns the power "off" to the device 10. PAIR is utilized to operatively pair the device 10 to a mobile communication device 200, such that when the mobile communications device transmits a signal, such as an incoming to the mobile communication device 200, the device 10 provides a vibratory alert. By way of example, the personal alert device 10 can be paired to a Bluetooth compatible mobile communication device 200.

The personal alert device 10 includes a vibrator mechanism 14 disposed within the housing 12. The vibrator mechanism 14 can be configured to vibrate in a manner that it is inaudible. This improves upon known devices that very noisily vibrate in such a manner as to audibly let those nearby hear that the device is "ringing." Such noise can be as bothersome as an audibly ringing telephone. The vibrator mechanism 14 is a vibrator motor in at least one embodiment.

By way of example, the vibrator mechanism 14 is configured and controlled by a processor 100 to vibrate when an incoming call, message, or the like, arrives at the mobile communication device 200, such as a phone. In at least one embodiment, this requires vibratory alert system requires no interaction with the personal alert device 10 to be able to answer the call on the phone.

The vibration pattern produced by the vibration mechanism 14 can vary. By way of example, the vibration pattern can be one second on, one second off, and repeating for a predetermined time interval. Another distinct vibration pattern can be utilized when a voice mail message has been left, such as half second on, half second off, and repeating for a predetermined time interval. Yet another distinct vibration pattern can be utilized when an SMS message has been received, such as three short bursts of one quarter second on, one quarter second off, and repeating for a predetermined time interval. The vibratory patterns can be varied.

The personal alert device 10 includes processor 100 disposed within the housing. The processor 100 can be an electrical circuit, such as, for example, but not limited to, the electrical circuit depicted collectively in FIG. 5-9, that is configured to provide the functions and tasks of the personal alert device 10 disclosed herein.

The processor 100 is configured to pair uniquely and wirelessly communicate with a mobile communications device 200. Communication between with the personal alert device 10 and the mobile communication device 200 occurs within a defined distance. The processor 100 of the personal alert device 10 is operative to receive a mobile communication signal 36 from the mobile communication device 200. The processor 100 of the personal alert device 10 is further configured to activate the vibrator mechanism 14 to alert the wearer discreetly to the presence of the mobile communication signal 36.

By way of example, the processor 100 can enable the personal alert device 10 to make a connection with a Bluetooth phone, a mobile communication device 200, and maintain the pairing information with that phone. Additionally, the processor 100 can detect when the mobile communication device 200 is ON and in range. Furthermore, the processor 100 can enable and turn ON the personal alert device 10 when it is known that the mobile communication device 200 is in range.

The personal alert device 10 includes a power source 20 disposed within the housing 12. In at least one embodiment, the power source 20 is a rechargeable lithium ion battery. The power source 20 can be recharged with the personal alert device 10 is connected to a charging device (not shown) through plug 22, for example. Alternatively, the power source 20 can be recharged through a mini-USB port 24, or a touch pad, for example.

The personal alert device 10 includes an ACKNOWLEDGE button 26 disposed upon the housing 12 and configured to be depressed by the wearer to acknowledge and to cease the vibratory alert. Use of the ACKNOWLEDGE button 26 by the wearer prevents prolonged vibration of the personal alert device 10 and conserves the power source 20.

In at least one embodiment, the personal alert device 10 includes a processor 100 configured to provide the wearer a unique vibratory alert, or the like, when a pairing to the mobile communications device 200 has been dropped. Foe example, if the personal alert device 10 and the mobile communication device 200, that are already paired, exceed the defined distance, and/or the pairing connectivity is otherwise dropped, a unique vibratory alert, or the like, is provided by the processor 100 through the vibrator mechanism 14 to the wearer.

The personal alert device 10 includes an attachment portion disposed upon the housing 12 and configured to provide attachment of the personal alert device 10 to the wearer. As depicted the attachment portion is a removable clip 28. By way of example, the attachment portion as a removable clip 28 can be configured for attachment to a brassiere, an undergarment brief, or the like, and remain unnoticed by those other than the wearer, thus providing discreet vibratory notification to the wearer with the knowledge of others. Other means for attachment of the personal alert device 10 with the attachment portion can be utilized.

Figure 1:
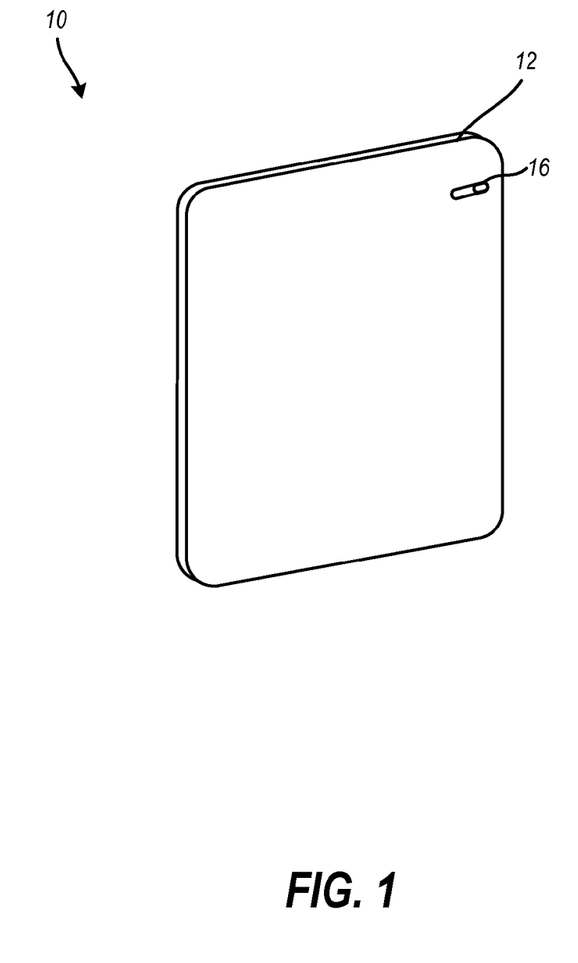
FIG. 1 is a front perspective view of a personal alert device, according to an embodiment of the technology described herein.
Figure 2:
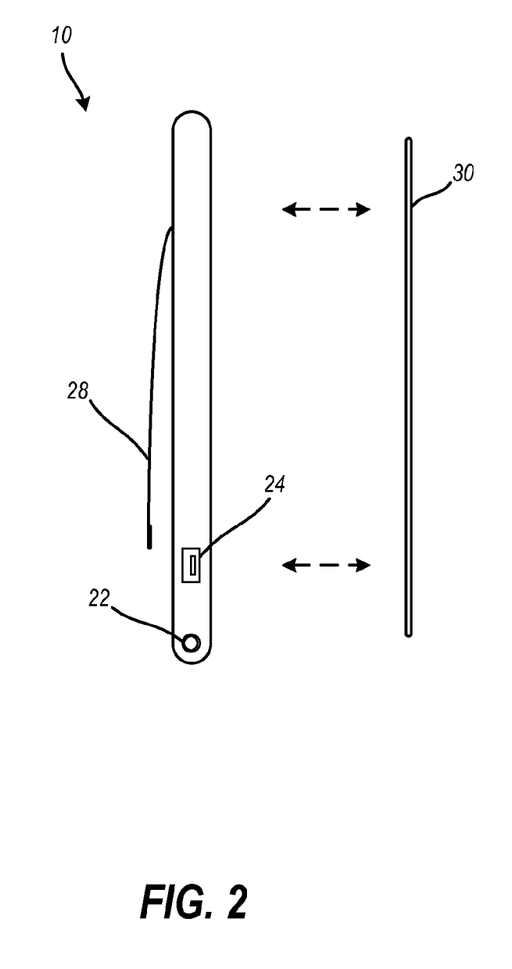
FIG. 2 is a side view of the personal alert device depicted in FIG. 1, according to an embodiment of the technology described herein.
Figure 3:
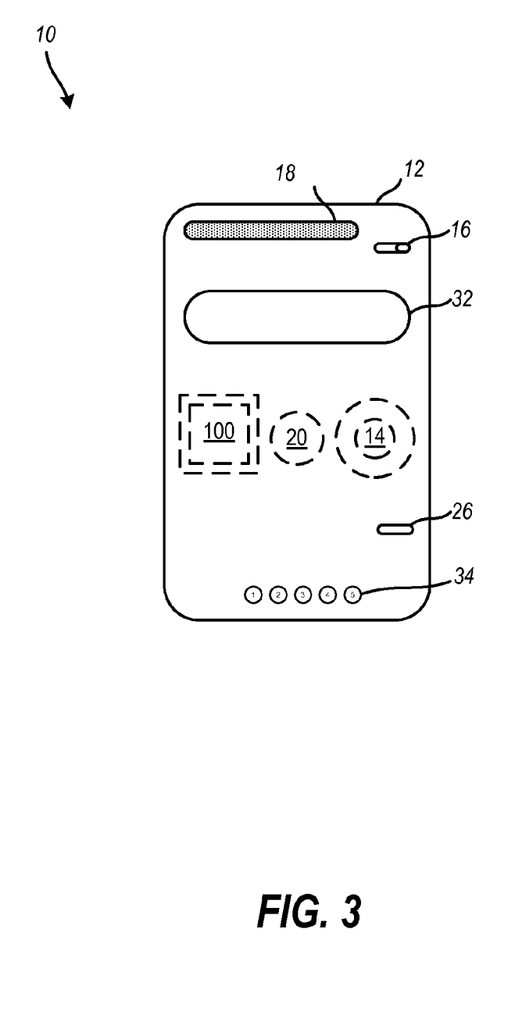
FIG. 3 is a front view of a personal alert device, according to an embodiment of the technology described herein.
Figure 4:
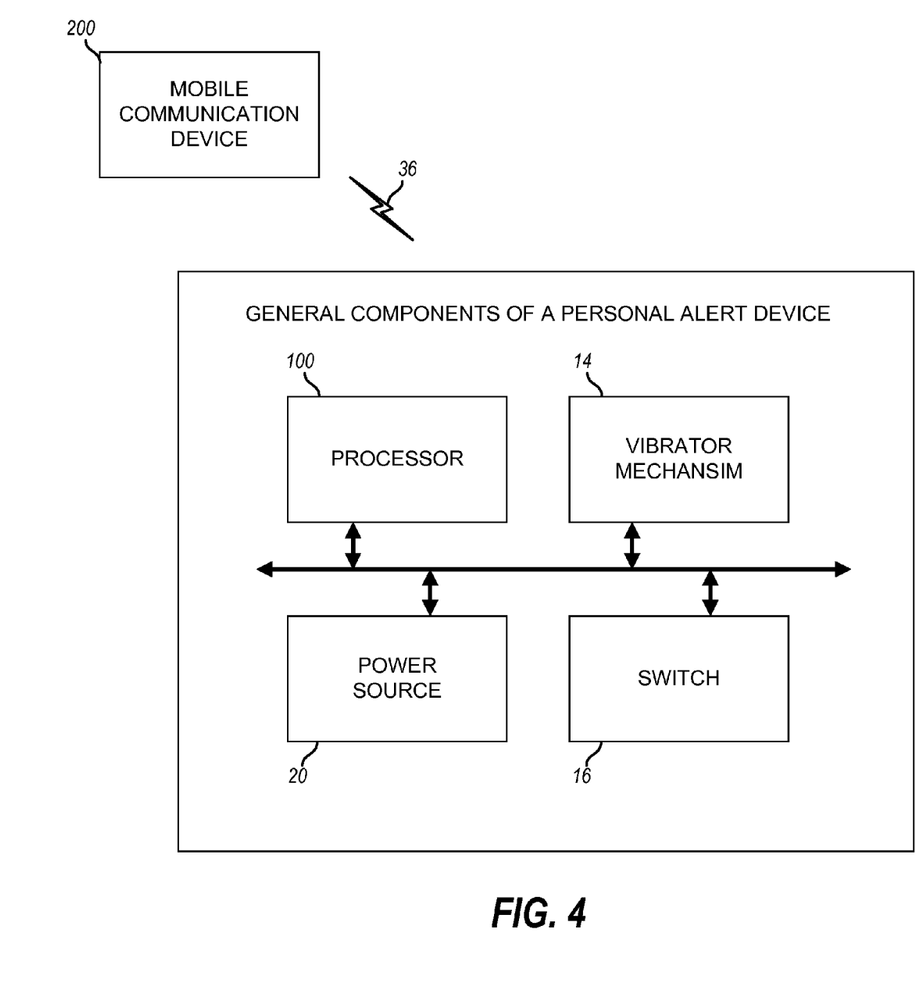
FIG. 4 is a block diagram illustrating, in particular, the major components of the personal alert device depicted in FIG. 1, according to an embodiment of the technology described herein.
Figure 5:
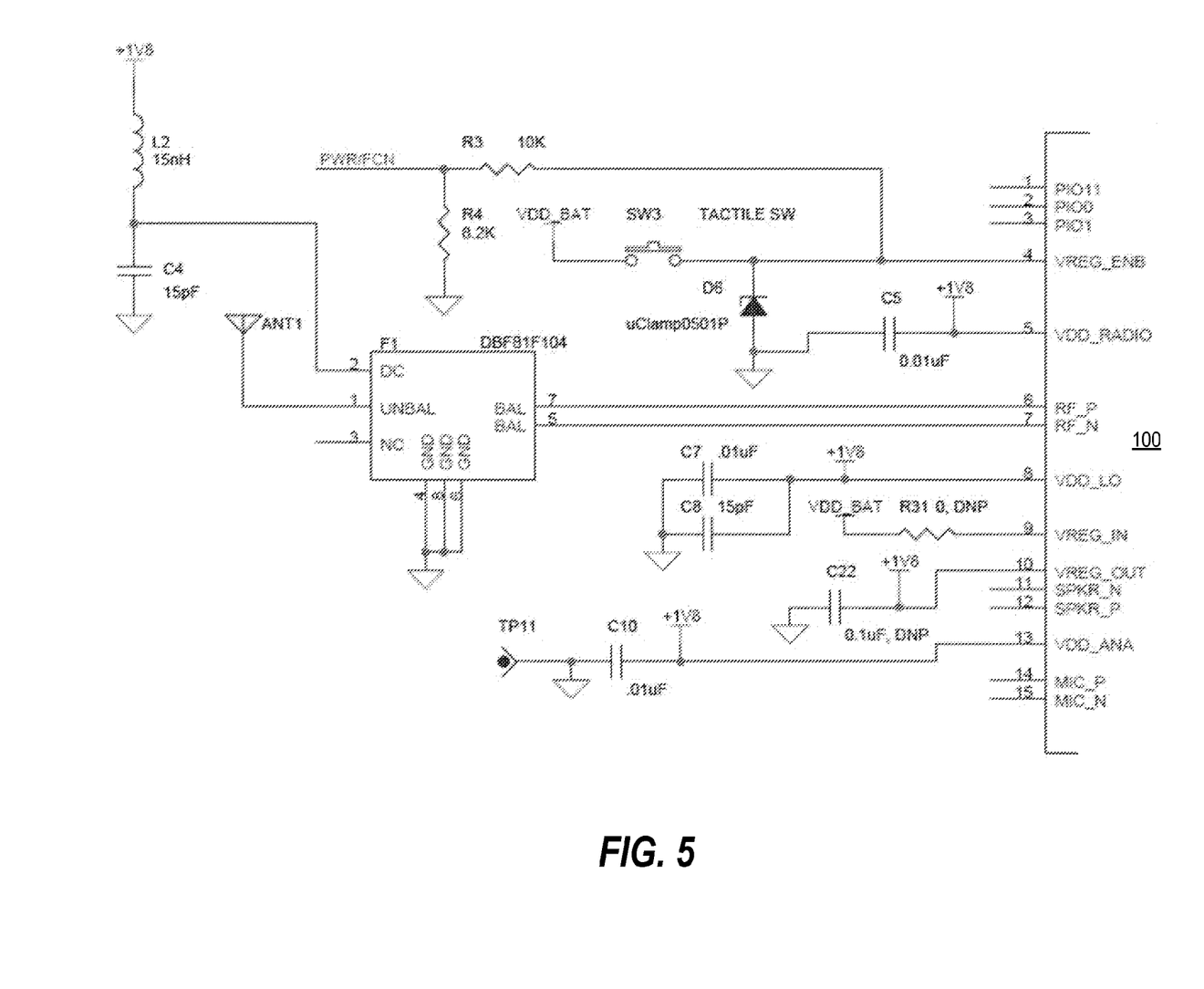
FIGS. 5 through 9 are schematic diagrams illustrating an electrical circuit capable of carrying out the disclosed functions of the personal alert device, according to an embodiment of the technology described herein.
Figure 6:
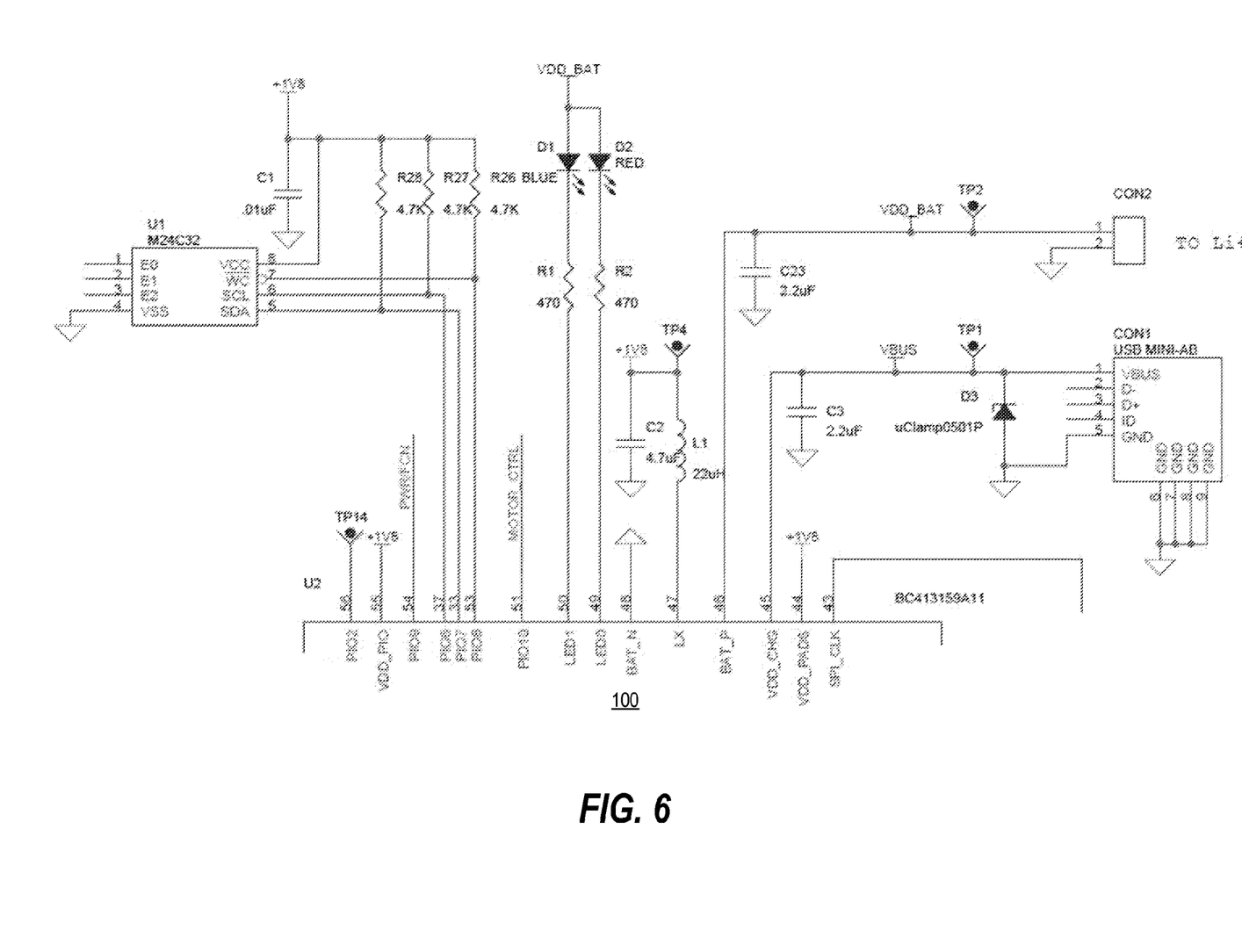
Figure 7:
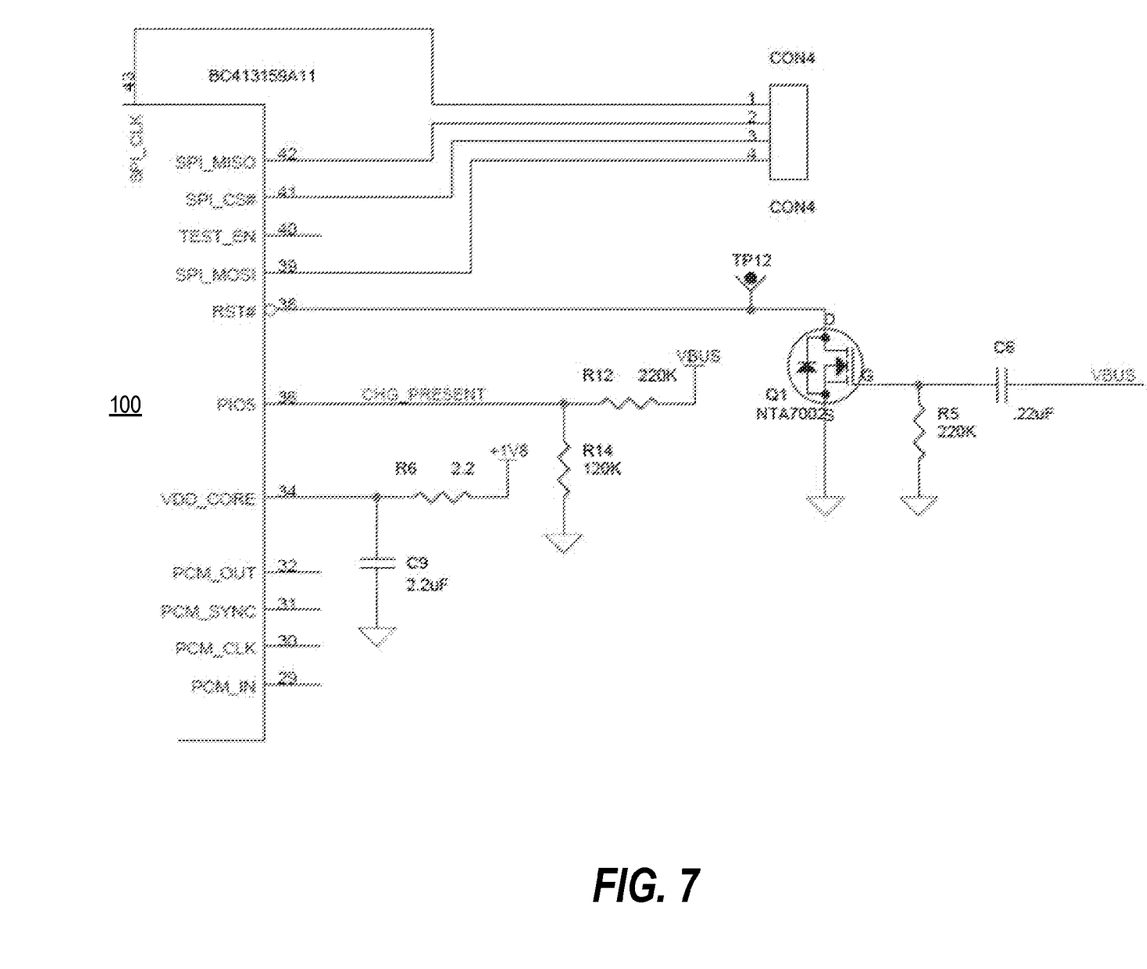
Figure 8:
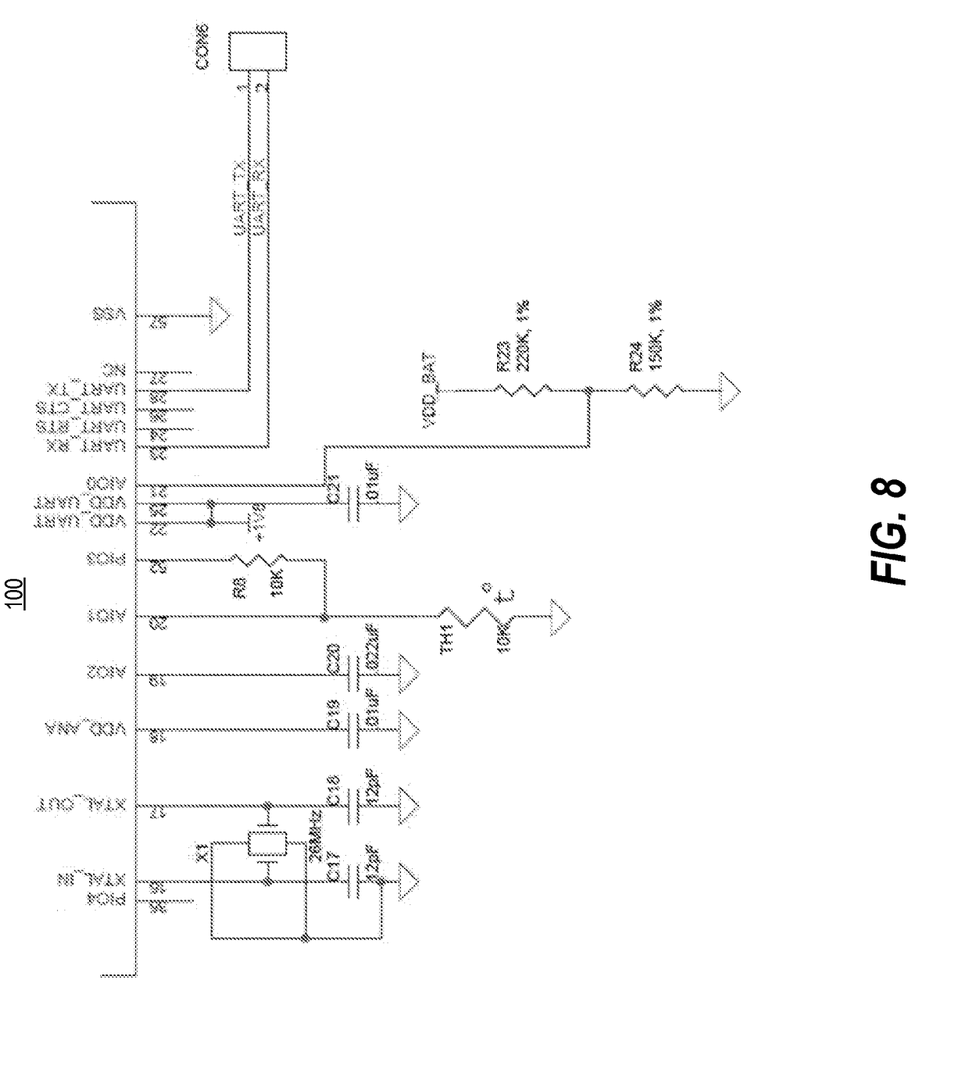
Figure 9:
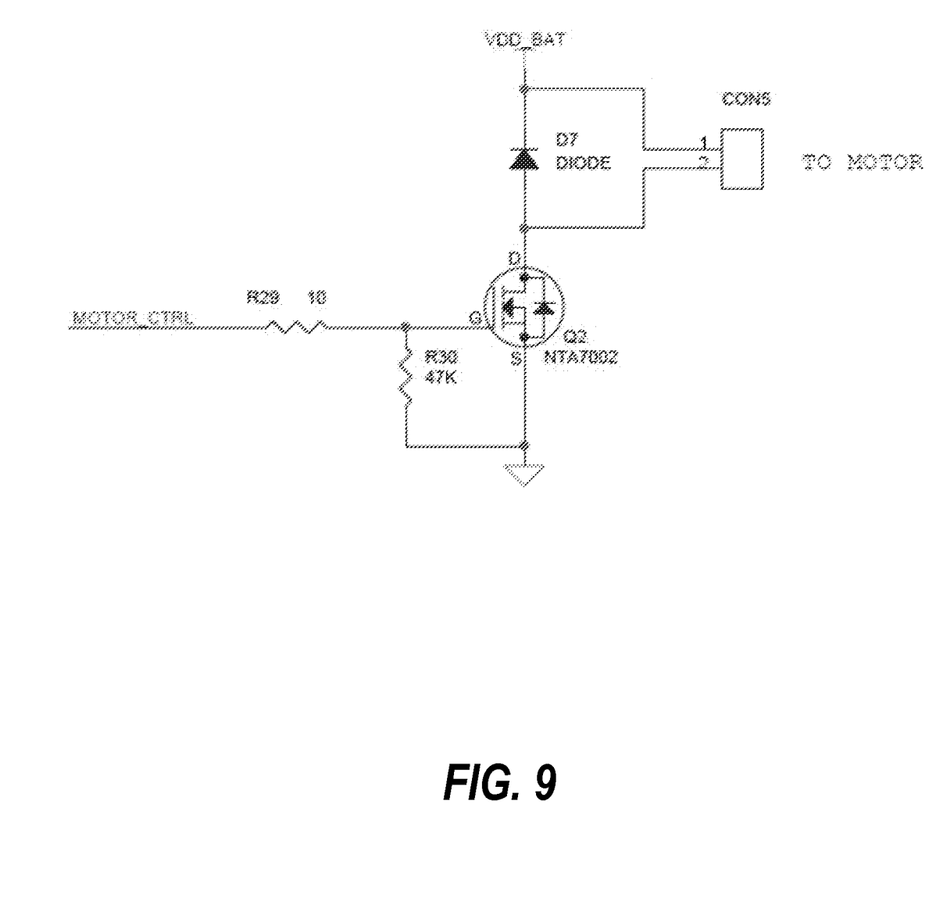

In an alternative embodiment, the attachment portion, such as the clip 28 depicted in FIG. 2, is not only configured to put pressure against the personal alert device 10 to clip it onto an article of clothing, lip of a pocket, belt loop, bra strap, and so forth, but also is configured to control the personal alert device 10. By way of example, when the clip 28 is in an open position, the personal alert device 10 is discoverable (in pair mode) and the status lights (power, paired, battery status, etc.) are in an ON status. When the clip 28 is in a closed position, the personal alert device 10 switches to an operation mode and is no longer discoverable. The status lights are not illuminated in the closed position.

By way of example, in at least one embodiment of the personal alert device 10, the attachment portion can be an adhesive panel 30. In this manner, the personal alert device 10 is utilized as a fashion accessory article. The adhesive panel 30 is configured for placement upon the housing 12 and is configured to adhere the fashion accessory article directly and temporarily to the skin of the wearer and under an item of apparel.

In at least one embodiment, the personal alert device 10 includes a speakerphone 18 to provide an auditory alert to audibly alert the wearer to the presence of the mobile communications signal 36. Although the personal alert device 10 is primarily for discreet vibratory alerts to a wearer, the inclusion of a speakerphone allows the wearer to uniquely customize the personal alert device for vibratory alerts only, audible alerts only, or combined vibratory and auditory alerts. As such, a user can obtain auditory signals if the personal alert device 10 is not on his or her person at the time, for example.

In at least one embodiment, the personal alert device 10 includes a customization interface 34. The customization interface 34 can include a series of keys or buttons that enable the user to set of customizations. The customization interface 34 can further be utilized with a display 32 to show the customization settings. The customization interface 34 can provide the wearer the option to set a unique vibratory signal pattern to a specific incoming call number. In this embodiment, the processor 100 is configured to recognize the incoming call number to the mobile communications device 200. The processor 100 activates the vibrator mechanism 14 with unique vibratory signal pattern such that the wearer knows an identity of the incoming call based upon the unique vibratory signal pattern.

The customization interface 34 can be further utilized to provide the wearer the option to initiate a unique set of rules to customize alerts. As such the processor 100 is configured to act based upon the rules customized by the wearer. The customization interface 34 allows the user to specify under what conditions and variables an alert is sent, allowing a highly customizable experience.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A personal alert device comprising:
   a housing configured for discreet, inconspicuous use by a wearer;
   a vibrator mechanism disposed within the housing;
   a processor disposed within the housing, the processor configured to pair uniquely and wirelessly communicate with a mobile communications device within a defined distance to the mobile communications device, operative to receive a mobile communications signal from the mobile communications device, and further configured to activate the vibrator mechanism to alert the wearer discreetly to the presence of the mobile communications signal; wherein the processor is configured to detect when the mobile communication device is ON and in range; wherein the processor is configured to enable and turn ON the personal alert device when it is known that the mobile communication device is in range; and wherein the processor is further configured to provide the wearer a unique vibratory alert when a pairing to the mobile communications device has been dropped;
   a power source disposed within the housing;
   a switch disposed upon the housing and configured to provide ON, OFF, and PAIR options to the wearer, wherein PAIR is utilized to actuate the processor to operatively pair the personal alert device to the mobile communication device, such that when the mobile communications device transmits a signal, the personal alert device provides a vibratory alert; and
   an ACKNOWLEDGE button disposed upon the housing and configured to be depressed by the wearer to acknowledge and to cease the vibratory alert to prevent prolonged vibration of the personal alert device and to conserve the power source.

2. The personal alert device of claim 1, further comprising:
   an attachment portion disposed upon the housing and configured to provide attachment of the personal alert device to the wearer and configured to control the operational mode of the personal alert device.

3. The personal alert device of claim 1, wherein the vibrator mechanism is configured to vibrate in a manner that is inaudible.

4. The personal alert device of claim 1, further comprising:
   a speakerphone to provide an auditory alert to audibly alert the wearer to the presence of the mobile communications signal.

5. The personal alert device of claim 1, wherein the processor is further configured to provide the wearer a unique vibratory alert when a pairing to the mobile communications device has been dropped.

6. The personal alert device of claim 1, further comprising:
a customization interface to provide the wearer the option to set a unique vibratory signal pattern to a specific incoming call number, wherein the processor is configured to recognize the incoming call number to the mobile communications device, and wherein the processor activates the vibrator mechanism with unique vibratory signal pattern such that the wearer knows an identity of the incoming call based upon the unique vibratory signal pattern.

7. The personal alert device of claim 1, further comprising:
a customization interface to provide the wearer the option to initiate a unique set of rules to customize alerts, wherein the processor is configured to act based upon the rules customized by the wearer.

8. A fashion accessory article operative to provide the wearer a vibratory alert to indicate the presence of a mobile communications signal from a mobile communications device, the fashion accessory comprising:
a housing configured for personal use to be entirely worn in a discreet and inconspicuous manner;
a vibrator mechanism disposed within the housing;
an electrical circuit and processor disposed within the housing and configured for pairing and wireless communication with the mobile communications device within a defined distance, operative to receive the mobile communications signal from the mobile communications device, and further configured to activate the vibrator mechanism to alert the wearer discreetly to the presence of the mobile communications signal; wherein the processor is configured to detect when the mobile communication device is ON and in range; wherein the processor is configured to enable and turn ON the personal alert device when it is known that the mobile communication device is in range; and wherein the processor is further configured to provide the wearer a unique vibratory alert when a pairing to the mobile communications device has been dropped;
a power source disposed within the housing; and
an attachment portion configured to provide attachment of the fashion accessory article to the wearer and configured to control the operational mode of the personal alert device, wherein the fashion accessory article is worn under an item of apparel and directly adjacent to the body of the wearer to remain unseen;
a switch disposed upon the housing and configured to provide ON, OFF, and PAIR options to the wearer, wherein PAIR is utilized to actuate the processor to operatively pair the personal alert device to the mobile communication device, such that when the mobile communications device transmits a signal, the personal alert device provides a vibratory alert; and
an ACKNOWLEDGE button disposed upon the housing and configured to be depressed by the wearer to acknowledge and to cease the vibratory alert to prevent prolonged vibration of the personal alert device and to conserve the power source.

9. The fashion accessory article of claim 8, further comprising:
an adhesive panel configured for placement upon the housing and configured to adhere to the fashion accessory article directly to the skin of the wearer and under the item of apparel.

10. The fashion accessory article of claim 8, wherein the attachment portion is configured for attachment to a brassiere.

11. The fashion accessory article of claim 8, wherein the attachment portion is configured for attachment to an undergarment brief.

12. The fashion accessory article of claim 8, further comprising:
a customization interface to provide the wearer of the fashion accessory article the option to set a unique vibratory signal pattern to a specific incoming call number, wherein the processor is configured to recognize the incoming call number to the mobile communications device, and wherein the processor activates the vibrator mechanism with unique vibratory signal pattern such that the wearer knows an identity of the incoming call based upon the unique vibratory signal pattern; and
a customization interface to provide the wearer the option to initiate a unique set of rules to customize alerts, wherein the processor is configured to act based upon the rules customized by the wearer.

13. The fashion accessory article of claim 8, further comprising:
a switch disposed upon the housing and configured to provide ON, OFF, and PAIR options to the wearer.

14. The fashion accessory article of claim 8, further comprising:
a speakerphone to provide an auditory alert to audibly alert the wearer to the presence of the mobile communications signal.

15. The fashion accessory article of claim 8, wherein the vibrator mechanism is configured to vibrate in a manner that is inaudible.

16. An incoming signal vibratory alert system comprising:
a wireless communications device; and
a personal alert device paired uniquely and wirelessly to the wireless communications device to communicate with the wireless communications device within a defined distance, operative to receive a wireless communications signal from the wireless communications device, and further configured to activate a vibrator mechanism disposed within the personal alert device to alert the wearer discreetly to the presence of the wireless communications signal with a vibratory alert, the personal alert device having:
a housing configured for discreet, inconspicuous use by a wearer;
a processor disposed within the housing, the processor configured to pair uniquely and wirelessly communicate with a mobile communications device within a defined distance to the mobile communications device, operative to receive a mobile communications signal from the mobile communications device, and further configured to activate the vibrator mechanism to alert the wearer discreetly to the presence of the mobile communications signal; wherein the processor is configured to detect when the mobile communication device is ON and in range; wherein the processor is configured to enable and turn ON the personal alert device when it is known that the mobile communication device is in range; and wherein the processor is further configured to provide the wearer a unique vibratory alert when a pairing to the mobile communications device has been dropped;
a power source disposed within the housing;
a switch disposed upon the housing and configured to provide ON, OFF, and PAIR options to the wearer, wherein PAIR is utilized to actuate the processor to operatively pair the personal alert device to the mobile communication device, such that when the mobile communications device transmits a signal, the personal alert device provides a vibratory alert; and an ACKNOWLEDGE button disposed upon the housing and configured to be depressed by the wearer to acknowledge and to cease the vibratory alert to prevent prolonged vibration of the personal alert device and to conserve the power source.

17. The system of claim 16, further comprising:

an attachment portion configured to provide attachment of the personal alert device to the wearer and configured to control the operational mode of the personal alert device, wherein the personal alert device is worn under an item of apparel and directly adjacent to the body of the wearer to remain unseen.

* * * * *